United States Patent [19]

Reiter

[11] Patent Number: 4,946,132

[45] Date of Patent: Aug. 7, 1990

[54] MAGNET ARMATURE

[75] Inventor: Ferdinand Reiter, Markgroeningen, Fed. Rep. of Germany

[73] Assignee: Robert Bosch GmbH, Stuttgart, Fed. Rep. of Germany

[21] Appl. No.: 442,814

[22] Filed: Nov. 29, 1989

[30] Foreign Application Priority Data

Feb. 15, 1989 [DE] Fed. Rep. of Germany ....... 3904447

[51] Int. Cl.[5] .............................................. F16K 31/06

[52] U.S. Cl. ............................... 251/129.21; 239/585; 335/261

[58] Field of Search ....................... 251/129.21, 129.22; 239/585; 335/261, 264, 279

[56] References Cited

U.S. PATENT DOCUMENTS 4,342,421 8/1982 Gray ................................... 239/585
4,651,931 3/1987 Hans et al. .

FOREIGN PATENT DOCUMENTS 3418761 11/1985 Fed. Rep. of Germany .

*Primary Examiner*—Arnold Rosenthal
*Attorney, Agent, or Firm*—Edwin E. Greigg

[57] ABSTRACT

Known magnet armatures for electromagnetically activated valves are machined out of solid material and are relatively high in weight, so their switching times are not short enough. The magnet armature of this invention is intended to be simple to produce and intrinsically low in weight. To enable providing the magnet armature with a wall of slight thickness, the circumference of the magnet armature, at least in a region in which it surrounds the valve body, is profiled in a undulating pattern, such that so-called wave troughs contacting the valve body connecting tube and crests protruding radially beyond them are formed. The troughs are joined to the valve body, and between the wave crests. The magnet armature may be produced by sintering, by severing it from a profiled tube, or by deformation of a tube. The magnet armature is used in a fuel injection valve for fuel injection systems in internal combustion engines.

11 Claims, 2 Drawing Sheets

MAGNET ARMATURE

BACKGROUND OF THE INVENTION

The invention relates to a magnet armature of the type described hereinafter. A magnet armature, manufactured from a massive material by drilling and removing surface material by machining, is already known (DE laid-open application No. 3,418,761 or U.S. Pat. No. 4,651,931), wherein the various steps in manufacturing are very cost-intensive and wherein burrs that appear at a wide variety of locations must be removed. In addition, this known magnet armature is relatively heavy, which results in an unwanted delay in the movement of the magnet armature when excited or when excitation is removed, due to the greater mass that must be accelerated.

OBJECT AND SUMMARY OF THE INVENTION

On the other hand, the magnet armature according to the invention has an advantage that it is simple and inexpensive to manufacture and that, weighing as little as possible, it also has flow channels for the medium to be controlled. Burr removal processes are rendered unnecessary by forging, and, due to its light weight, very short response times can be achieved upon excitation of or the removal of excitation from the electromagnet.

The structural arrangement enables advantageous extensions and improvements of the magnet armature set forth herein.

It is particularly advantageous that the entire axial length of the magnet armature be embodied with undulations around its entire circumferential profile, and that the peaks of the undulations be provided with an essentially circular outside surface. By this means, the magnet armature can advantageously be sawed off from a tube having such a profile, or can be manufactured by sintering.

It is also advantageous to manufacture the magnet armature from a tube of annular cross section by deformation.

BRIEF DESCRIPTION OF THE DRAWINGS

Exemplary embodiments of the invention are presented in simplified form in the drawing and explained in greater detail in the following description.

DESCRIPTION OF THE EXEMPLARY EMBODIMENTS

Figure 1:
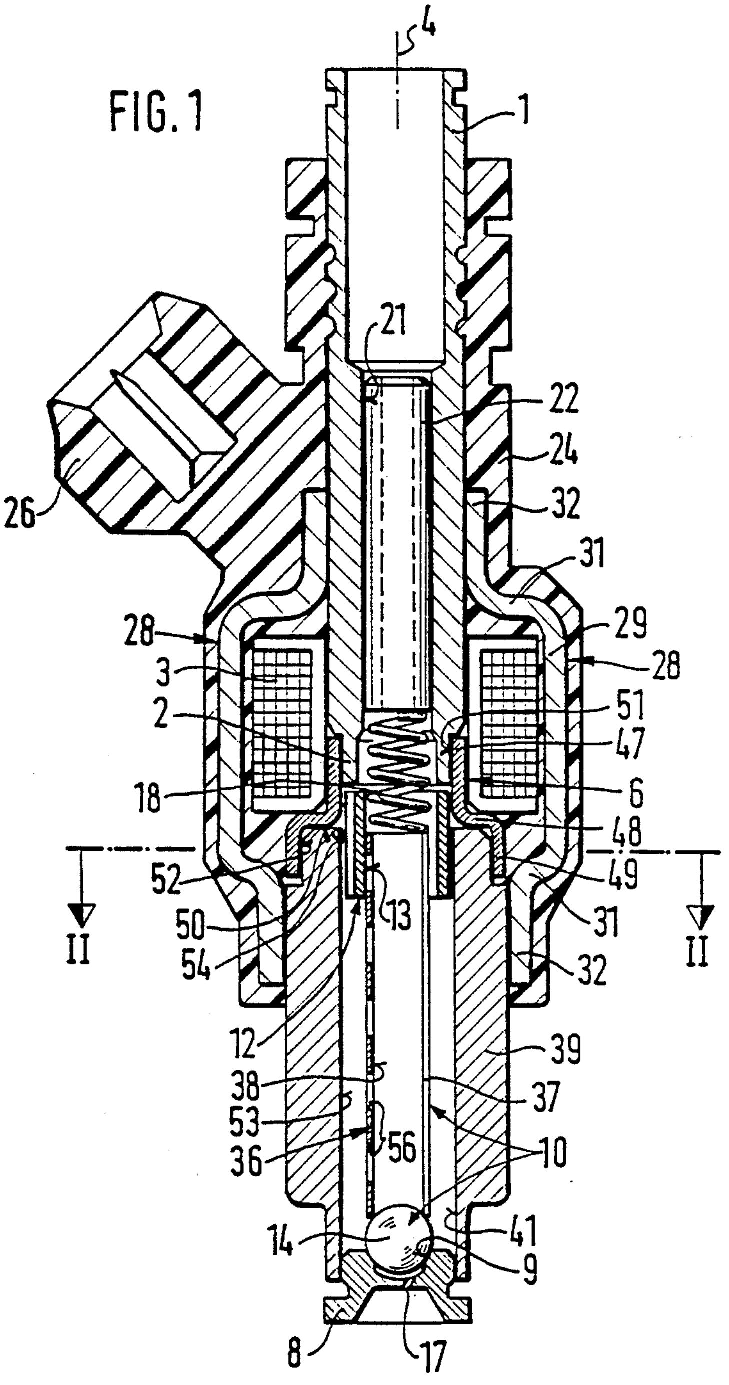
FIG. 1 shows an electromagnetically activated fuel injection valve with a first embodiment of a magnet armature embodied according to the invention.

The electromagnetically activated valve shown by way of example in FIG. 1, in the form of a fuel injection valve as an assembly within a fuel injection unit for a compressed-mixture, applied-ignition combustion engine, has a tubular metal connection tube 1 of ferromagnetic material with a magnet coil 3 disposed on its lower core extremity 2. The connection tube 1 thus serves simultaneously as a core. An intermediate piece 6, concentric with the longitudinal axis of the valve 4, is tightly joined, for example by soldering or welding, to the core extremity 2 of the connection tube 1. The intermediate piece 6 is made of nonmagnetic sheet material that has been cupped and has a first connecting section 47 that is coaxial with the longitudinal axis of the valve 4, which first connecting section completely surrounds and is tightly joined to the core extremity 2. A collar 48, extending radially outward from the first connecting section 47 leads to a second connecting section 49 on intermediate piece 6, which second connecting section extends axially coaxial with the longitudinal axis of the valve 4 and partially overlaps and is tightly joined, for example by soldering or welding, to an annular connecting piece 39. The diameter of the second connecting section 49 is thus greater than that of the first connecting section 47, so that, in the assembled state, one face 50 of the tubular connecting piece 39 contacts the collar 48. To enable the valve to have a small outside dimension, the first connecting section 47 surrounds a holding shoulder 51 in an indentation of the core extremity 2, said indentation having a smaller diameter than the outer diameter of the connection tube 1, and the second connecting section 49 surrounds a holding shoulder 52 on an end portion of connecting piece 39, which is likewise embodied with a smaller diameter than the main body portion of connecting piece 39.

The connecting piece 39 is made of ferromagnetic material and the end away from face 50 has an inner guide bore 41, a valve seat piece 8 is tightly inserted into inner guide bore 41 for example by screwing, welding, or soldering. The guide bore 41 passes into a transitional bore 53, which is adjoined by a slide bore 54 in the vicinity of the face 50, into which slide bore, a magnet armature 12 extends and through which slide bore the magnet armature 12 is passed. This permits guide bore 41 and slide bore 54 to be fabricated with a single setup during manufacturing, resulting in extremely precise mutual alignment of the bores. The magnet armature 12 passes neither through the intermediate piece 6 nor through the transitional bore 53 of connecting piece 39. The axial extent of slide bore 54 is small compared to the axial length of magnet armature 12, for example, approximately 1/15 the length of the magnet armature.

Facing away from connection tube 1, the metal valve seat piece 8 has a fixed valve seat 9 oriented toward the core extremity 2 of connection tube 1. The sequential arrangement of connection tube 1, intermediate piece 6, connecting piece 39, and valve seat piece 8 comprises a rigid metal unit. One end of the valve stem 10, comprising a thin-walled, round connecting tube 36 and a valve closing member 14, is inserted into and joined to a mounting opening 13 in the magnet armature 12, the closing member 14, which can be shaped, for example, as a sphere, hemisphere, or some other shape, being connected to the end of connecting tube 36 facing valve seat 9.

Facing away from closing member 14, a resetting spring 18, one end of which contacts one end face of connecting tube 36, extends into mounting opening 13 in the magnet armature 12. The other end of resetting spring 18 extends into a flow bore 21 in connection tube 1 and there contacts a tubular adjustment bushing 22, which is, for example, screwed or pressed into the flow bore 21 to permit adjustment of the spring tension. At least part of intermediate piece 6 and connecting tube 36. Plastic jacket 24 can be obtained by pouring or spraying coating with plastic. A male electrical connector 26 is formed onto the plastic jacket 24, through which connector electrical contact is established with magnet coil 3 for excitation thereof.

Magnet coil 3 is surrounded by at least one magnetic conducting member 28 that serves to direct the lines of force in the magnetic field, said conducting member being made of ferromagnetic material and extending axially along the entire length of magnet coil 3 and at least partially surrounding the circumference of magnet coil 3.

The conducting member 28 is embodied in the shape of a bracket having a bulging central region 29 that matches the contour of the magnet coil, said central region surrounding the circumference of magnet coil 3 only partially and possessing end sections 31 that extend radially inward, each of which end sections, partially surrounding connection tube 1 on the one hand and connecting tube 36 on the other hand, merges into the end of an axially oriented shell 32. FIG. 1 shows a valve with two conducting members 28 that can be disposed opposite each other. For spatial considerations, it can also be practical to have the male electrical connector 26 oriented in a plane that is rotated 90°, hence standing perpendicular to a plane through conducting members 28.

A linear slit 37 is provided which penetrates radially through the wall of connecting tube 36 and extends along the entire length of connecting tube 36, through which fuel entering an internal channel 38 in connecting tube 36 from magnet armature 12 can reach the transitional bore 53 and from there the valve seat 9, downstream from which, in valve seat piece 8, at least one spray ejection opening 17 is provided, through which the fuel can be ejected as a spray into a vacuum conduit or a cylinder in a combustion engine.

The connection between connecting tube 36, on the one hand, and magnet armature 12 and closing member 14, on the other hand, is advantageously established by welding or soldering. In this exemplary embodiment, longitudinal slit 37 that penetrates outward through the tube wall from internal channel 38 runs from one end of connecting tube 36 to the other in a plane that passes through the longitudinal axis of the valve 4. The longitudinal slit 37 thus provides a large cross-section for hydraulic flow, through which the fuel can very rapidly get from internal channel 38 into transitional bore 53 and from there to valve seat 9. The thinwalled connecting tube 36 ensures the greatest stability with the least weight.

Connecting tube 36 can be fabricated by producing, for example by stamping, rectangular sheet metal pieces from a metal sheet as thick as the thickness of the tube wall, the lengths of said pieces corresponding to the axial length of the connecting tube 36 being produced and the widths of said pieces corresponding approximately to the circumference of the connecting tube to be produced. Thereupon, perhaps with the aid of a mandrel, each sheet metal piece is rolled or folded into the shape of the desired connecting tube 36. Here, the two lengthwise sides of the sheet metal pieces that make up connecting tube 36 form the slit 37 by facing each other with a separation. To prevent any undesired effect on the shape of the spray of fuel from spray ejection opening 17 due to any asymmetrical fuel flow to valve seat 9, it is advantageous that connecting tube 36 be provided with several flow bores 56 that penetrate the tube wall of connecting tube 36 and are distributed approximately symmetrically in the axial direction as well.

The flow bores 56 are obtained either by producing the sheet metal pieces 55 from already perforated metal sheets, or by creating the flow bores 56 at the same time the sheet metal pieces 55 are produced. The flow bores 56 can run in such a way that the fuel exiting into transition bore 53 exits radially, or in such a way that an extensive swirl is imparted to it. Here, the flow bores 56 can also be slanted toward valve seat 9.

Figure 2:
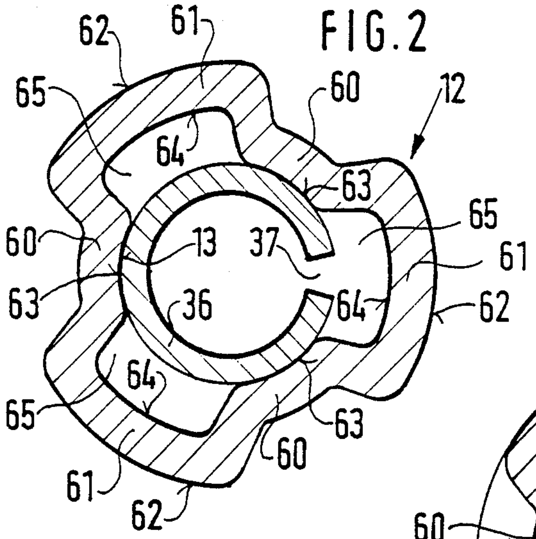
FIG. 2 shows a section along line II—II in FIG. 1.

In the exemplary embodiment according to FIG. 1 and FIG. 2, the hollow magnet armature 12 according to the invention has circumference with an undulating profile along its entire length in such a way that an alternating series of so-called valleys 60, and peaks 61 that rise above them, are formed adjacent to the connecting tube 36 that is part of the valve stem 10. The peaks 61 herein have an essentially circular outside surface 62, by means of which the magnet armature 12 is borne and can slide within slide bore 54. The valleys 60 of magnet armature 12 have inner surfaces 63 that form the mounting hole 13 and contact the connecting tube 36 of valve stem 10, and which are joined to it, for example by laser welding. The peaks 61 have inner surfaces 64 facing the connecting tube 36, said inner surfaces being radially separated from connecting tube 36 at a distance such that axially oriented flow sections 65 are formed between each of the inner surfaces 64 of peaks 61 on magnet armature 12 and the connecting tube 36.

In each of the exemplary embodiments in FIGS. 1 and 2, three valleys 60 and three peaks 61 are provided on magnet armature 12. The number of valleys 60 and 61, and thus the shape of the circumferential profile of magnet armature 12, can be altered and adapted to the demands of the electromagnetically activated valve in question. The magnet armature 12 according to the invention can be produced, for example by sintering, by deforming a circular tube of the required length for armature 12, or with a profiled tube from which magnet armatures 12 of the required length are separated. In all of these manufacturing methods, cutting and machining are kept to a minimum or avoided entirely, so that deburring need be performed only to slight extent or not at all. At the same time, the undulating profile of magnet armature 12 facilitates the creation of flow sections 65 via which, via the outside circumference of valleys 60 the fuel can flow unimpeded along magnet armature 12, even when valve stem 10 is embodied as a solid in place of connecting tube 36. In each case, the wall of the hollow magnet armature 12 should be as thin as possible in order to keep the weight of magnet armature 12 as low as possible.

In the second exemplary embodiment of a magnet armature according to the invention, the components that remain unchanged or operate identically retain the same indices as those in the exemplary embodiment in FIGS. 1 and 2. In contrast to the exemplary embodiment in FIGS. 1 and 2, the magnet armature 12 in FIGS. 3 and 4 has only one surrounding region 70 around the valve stem 10, which is in the form of its connecting tube 36, said surrounding region has an undulating profile and, as in the exemplary embodiment according to FIGS. 1 and 2, has valleys 60 contacting connecting tube 36, said valleys alternating with peaks 61 that rise radially above them. The inner surfaces 63 of valleys 60 likewise contact the circumference of connecting tube 36 and are joined to it in this region 70 of magnet armature 12. The embodiment of remaining region 71 of magnet armature extending toward core extremity 2 is tubular, with an annular cross-section, and has a clear passage 72 that is larger than the diameter of mounting hole 13. Region 71 preferably extends into the slide bore 54.

Figure 4:
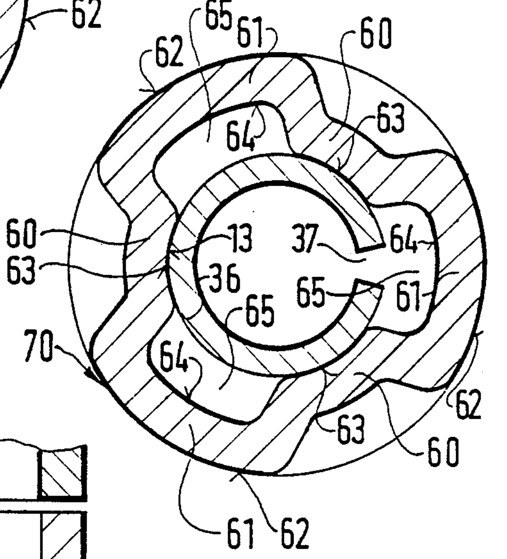
FIG. 4 shows a section along line IV—IV in FIG. 3.
Figure 3:
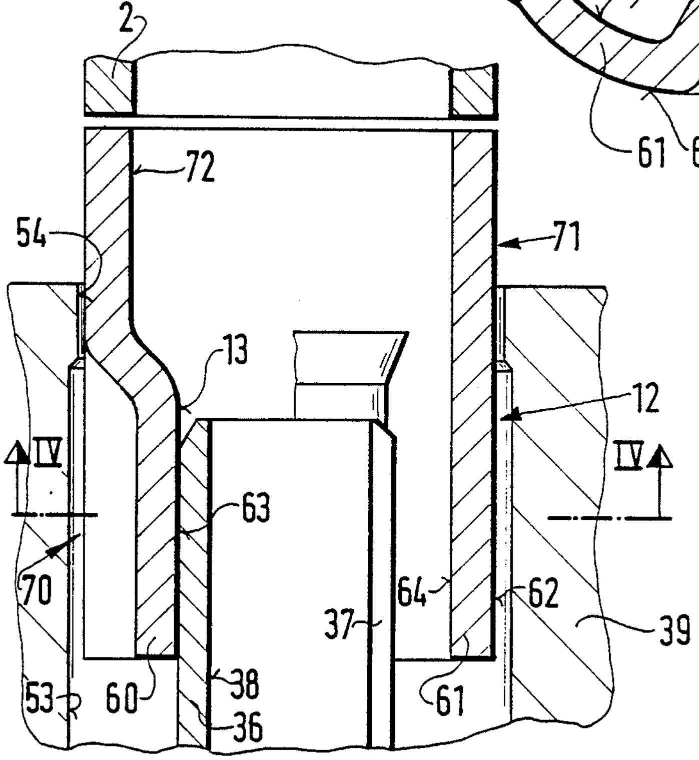
FIG. 3 shows a partial view of a second exemplary embodiment of a magnet armature embodied according to the invention.

The exemplary embodiment of magnet armature 12 shown in FIGS. 3 and 4 likewise has a thin wall and can be manufactured either by sintering or by deforming a circular tube of the required length for magnet armature 12 in region 70 to produce the undulating circumferential region of magnet armature 12 to permit attachment to connecting tube 36.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hollow magnet armature for an electromagnetically activated fuel injection valve for fuel injector units in compressed-mixture, applied-ignition combustion engines, having at least one core surrounded by a magnet coil, said core facing said hollow magnet armature, a valve stem that extends in a direction of a valve seat joined to said hollow magnetic armature, said hollow magnet armature (12) having an undulating profile including alternate valleys (60) and peaks (61) in at least one region (70) where it surrounds the valve stem (36, 14) said valleys (60) are in contact with the valve stem (36, 14) and said peaks (61) rise radially above said valleys to form axially oriented flow passages (65).

2. A hollow magnet armature according to claim 1, in which the circumference of the hollow magnet armature (12) has an undulating profile including valleys and peaks along its entire axial length.

3. A hollow magnet armature according to claim 1, in which said peaks (61) have an essentially circular outside surface (62).

4. A hollow magnet armature according to claim 2, in which said peaks (61) have an essentially circular outside surface (62).

5. A hollow magnet armature according to claim 1, in which said hollow magnet armature (12) is produced by sintering.

6. A hollow magnet armature according to claim 1, in which said hollow magnet armature (12) is produced by deforming a tube of annular cross-section.

7. A hollow magnet armature according to claim 2, in which said hollow magnet armature (12) is produced by deforming a tube of annular cross-section.

8. A hollow magnet armature according to claim 1, in which said hollow magnet armature (12) is produced from a profiled tube.

9. A hollow magnet armature according to claim 2, in which said hollow magnet armature (12) is produced from a profiled tube.

10. A hollow magnet armature according to claim 1, in which said valleys of said hollow magnet armature include an inner surface (63) in contact with the valve stem (36, 14) and that inner surface (64) of said peaks (61) facing the valve stem (36, 14) is at a radial distance from the valve stem (36, 14).

11. A hollow magnet armature according to claim 2, in which said valleys of said hollow magnet armature include an inner surface (63) in contact with the valve stem (36, 14) and that inner surface (64) of said peaks (61) facing the valve stem (36, 14) is at a radial distance from the valve stem (36, 14).

* * * * *